United States Patent
Kanemitsu

[11] Patent Number: 5,946,427
[45] Date of Patent: *Aug. 31, 1999

[54] IMAGE READING METHOD AND IMAGE READING APPARATUS

[75] Inventor: Norio Kanemitsu, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/509,236

[22] Filed: Jul. 31, 1995

[30] Foreign Application Priority Data

Dec. 9, 1994 [JP] Japan ................................. 6-306289

[51] Int. Cl.⁶ .................................................. G06K 7/00
[52] U.S. Cl. ........................ 382/312; 382/162; 358/509; 356/420; 356/425
[58] Field of Search .................................. 382/162, 165, 382/312; 358/500, 509, 510, 540; 359/227, 292, 297; 356/420, 425, 402

[56] References Cited

U.S. PATENT DOCUMENTS

| | | |
|---|---|---|
| 4,636,081 | 1/1987 | Saitoh et al. ............................ 356/420 |
| 4,652,913 | 3/1987 | Saitoh et al. ............................ 358/509 |
| 4,658,289 | 4/1987 | Nagano et al. ......................... 358/509 |
| 4,716,456 | 12/1987 | Hosaka .................................... 358/509 |
| 5,023,708 | 6/1991 | Maruyama et al. .................... 358/540 |
| 5,450,215 | 9/1995 | Iwama .................................... 358/509 |

*Primary Examiner*—Jose L. Couso
*Assistant Examiner*—Anh Hong Do
*Attorney, Agent, or Firm*—Nikaido, Marmelstein, Murray & Oram, LLP

[57] ABSTRACT

An image reading method and apparatus enable a high-speed, efficient reading of a multicolor image and a monochromatic image. The image reading apparatus has a color image pickup unit, a first light source and a second light source. An output switching unit selectively switches to either a first output state, where plural kinds of read information from the color image pickup unit are all output as a result of an image reading, or a second output state, where only one kind of read information among the plural kinds of read information from the color image pickup unit is selected to be output as a result of an image reading. A lighting control unit controls lighting conditions of the first light source and the second light source. A switching control unit controls a switching condition of the output switching unit.

18 Claims, 11 Drawing Sheets

IMAGE READING METHOD AND IMAGE READING APPARATUS

BACKGROUND OF THE INVENTION (1) Field of the Invention

The present invention relates to an image reading method and an image reading apparatus used for reading not only a color image (a multicolor image) but also a single color image (a monochormatic color image) with a color image pickup unit such as a color CCD.

With an improvement of a performance of an information processing apparatus such as a personal computer or an increase of a capacity of a storage medium such as a magneto-optic disk, an electronic filing system for reading, storing and retrieving an image has been spreading in recent years. For this, there is a demand for an image reading apparatus such as an image scanner which can read an image at a high speed. In addition to this, there is also a demand for an image reading apparatus which can efficiently read an image at a high speed in the case of both a monochromatic color image and a multicolor image.

(2) Description of the Related Art

FIG. 10 is block diagram of an image reading apparatus known in the art. In FIG. 10, reference numeral 100 denotes a color CCD, 200 denotes a white fluorescent lamp, 300 denotes a personal computer (PC), 400 denotes a lighting control unit, 500 denotes an image that is an object to be read such as an original.

The color CCD 100 reads the image 500 with reading wavelengths of three colors of red (R), green (G) and blue (B), and outputs it as read data of three colors (an RGB output).

The white fluorescent lamp 200 generates a white light containing light of all the above three wavelengths, and radiates it on the image 500. The personal computer 300 performs a reading process on the basis of the data output from the color CCD 100.

The lighting control unit 400 controls ON/OFF of the white fluorescent lamp 200 according to a signal for initiating or terminating the reading process on an image from the personal computer 300.

The image reading apparatus known in the art with the above structure radiates a light from the white fluorescent lamp 200 onto the image 500, receives a reflected light with the color CCD 100, obtains image data of three colors (R, G and B) of the image 500 from the received light on the basis of spectral characteristics of three colors of red (R), green (G) and blue (B), performs a necessary process such as amplification, A/D conversion, etc., and outputs it to the personal computer 300.

The personal computer 300 performs a reading process based on the image data of all three colors if the image 500 is a multicolor image (that is, in the case of a multicolor reading). If the image that is an object to be read 500 is a monochromatic color (a single color image) (in the case of a monochromatic color reading), the personal computer 300 performs a reading process based on the image data of any one of the images of these three colors.

There is another apparatus which performs a reading process to read an image (an image that is an object to be read 500) with a monochromatic color CCD 100A, three fluorescent lamps a red fluorescent lamp (R) 200A, a green fluorescent lamp (G) 200B and a blue fluorescent lamp (B) 200C and a lighting control unit 400A, instead of the above color CCD 100, the white fluorescent lamp 200 and the lighting control unit 400, as shown in FIG. 11.

The monochromatic color CCD 100A receives a light from the image 500, and outputs read information of a single color. The fluorescent lamps 200A through 200C generate a light of red (R), green (G) and blue (B), respectively, and radiate the light on the image 500.

The lighting control unit 400A controls the three fluorescent lamps 200A, 200B and 200C to be successively switched or lighted simultaneously, as described later, according to an instruction of a multicolor reading or a monochromatic color reading input from the personal computer 300.

In the image reading apparatus shown in FIG. 11, if the image 500 is a multicolor image, the lighting control unit 400A successively switches lighting conditions of the three fluorescent lamps 200A, 200B and 200C in order of, for example, the red fluorescent lamp 200A→the green fluorescent lamp 200B→the blue fluorescent lamp 200C, whereby only one light among three colors of R, G and B is successively radiated on the image 500. The monochromatic color CCD 100A reads the image 500 by receiving a reflected light in any one color among the three colors of R, G and B from the image 500, and outputs obtained image data one color by one color to the personal computer 300 to perform the reading process.

If the image 500 is a monochromatic color image, the lighting control unit 400A controls the three fluorescent lamps 200A, 200B and 200C to be lighted simultaneously to radiate the light of all three colors of R, G and B onto the image 500, and the monochromatic CCD 100A receives a reflected light and outputs image data to the personal computer 300 to perform a reading process. In this case, simultaneous lighting of the three fluorescent lamps 200A through 200C allows an increase in quantity of light, and increasing an illuminance of the reflected light from the image 500 so as to shorten a time required to store an electric charge in the monochromatic color CCD 100A to permit a reading process at a rate higher than that of a multicolor reading.

Even in the case of the monochromatic reading, the image reading apparatus shown in FIG. 10 performs the same reading process as the multicolor reading to obtain image data of three colors to read the image 500 on the basis of the image data of only one color. This image reading apparatus shown in FIG. 10 has therefore a disadvantage that a processing of the monochromatic reading, which is considered that the reading process must be quicker than the multicolor reading, is performed at the same rate as the multicolor reading.

In the image reading apparatus shown in FIG. 11, three fluorescent lamps 200A, 200B and 200C are simultaneously lighted so that the monochromatic reading may be performed at a rate higher than the multicolor reading. However, the three fluorescent lamps 200A, 200B and 200C are successively switched to ON and OFF upon the multicolor reading. As a result, nothing can prevent a light of a color of the fluorescent lamp that was lighted immediately before from remaining.

If a time interval of the lighting of the fluorescent lamps 200A, 200B and 200C is shortened too much, the monochromatic CCD 100A receives together an afterglow of another color of fluorescent lamp that was lighted immediately before although the monochromatic CCD 100A ought to receive a light of only, for example, green color. This makes it difficult to obtain accurate image data. In consequence, there is a limitation to shorten a time interval of lighting of the fluorescent lamps 200A, 200B and 200C in order to increase a processing rate of a reading.

In the case of a multicolor reading, the three fluorescent lamps 200A, 200B and 200C are required to be switched ON and OFF quite frequently until an end of the reading process. This leads to short service lives of the fluorescent lamps 200A, 200B and 200C.

SUMMARY OF THE INVENTION

To overcome the above problems, an object of the present invention is to provide an image reading method and an image reading apparatus enabling a high-speed, efficient multicolor image reading and monochromatic color image reading.

The present invention therefore provides an image reading method comprising the steps of providing a color image pickup unit for reading an image that is an object to be read at plural different reading wavelengths based on three primary colors of light to output it as plural kinds of read information, providing a first light source for generating a white light containing said plural reading wavelengths to radiate it on said image that is an object to be read, providing a second light source for generating a light if said image that is an object to be read is a monochromatic color image to radiate it on said image that is an object to be read, lighting only said first light source if said image that is an object to be read is a multicolor image to read said multicolor image by said color image pickup unit under a condition where a light from said first light source is radiated on said multicolor image, and outputting all the plural kinds of read information from said color image pickup unit it as a result of an image reading, and lighting said first light source and said second light source if said image that is an object to be read is a monochromatic color image to read said monochromatic color image by said color image pickup unit under a condition where lights from said first light source and said second light source are radiated on said monochromatic color image, and outputting only one kind of read information among plural kinds of read information output from said color image pickup unit as a result of an image reading.

According to the image reading method of this invention, if the image that is an object to be read is a multicolor image, only the first light source is lighted, and the multicolor image is read by the color image pickup unit as usual. If the image that is an object to be read is a monochromatic color image, a light in a specific color from the second light source is radiated on a monochormatic color image along with a white light from the first light source, and only one kind of read information among plural kinds of read information output from the color image pickup unit may be output as a result of a reading of a monochromatic color image. This invention therefore may largely increase a processing rate of the process performed when a monochromatic color image is read as compared with the process performed when a multicolor image is read.

The present invention also provides an image reading apparatus comprising a color image pickup unit for reading an image that is an object to be read at plural different reading wavelengths based on three primary colors of light and outputting it as plural kinds of read information, a first light source for generating a white light containing said plural reading wavelengths to radiate it on said image that is an object to be read, a second light source for generating a light if said image that is an object to be read is a monochromatic color image to radiate it on said image that is an object to be read, an output switching unit for selectively switching to either a first output state where said plural kinds of read information from said color image pickup unit are all output as a result of an image reading, or a second output state where only one kind of the read information among said plural kinds of the read information from said color image pickup unit is selected to be output as a result of an image reading, a lighting control unit for controlling lighting conditions of said first light source and said second light source, and a switching control unit for controlling a switching condition of said output switching unit, if said image that is an object to be read is a multicolor image, said lighting control unit causing only said first light source to be lit, and said switching control unit switching said output switching unit to said first output state, if said image that is an object to be read is a monochromatic color image, said lighting control unit causing said first light source and said second light source to be lit, and said switching control unit switching said output switching unit to said second output state.

According to the image reading apparatus of this invention, it is possible to readily carry out the image reading method of this invention, and largely improve a processing speed of the process performed when a monochromatic color image is read as compared with the process performed when a multicolor image is read.

Figure 1:
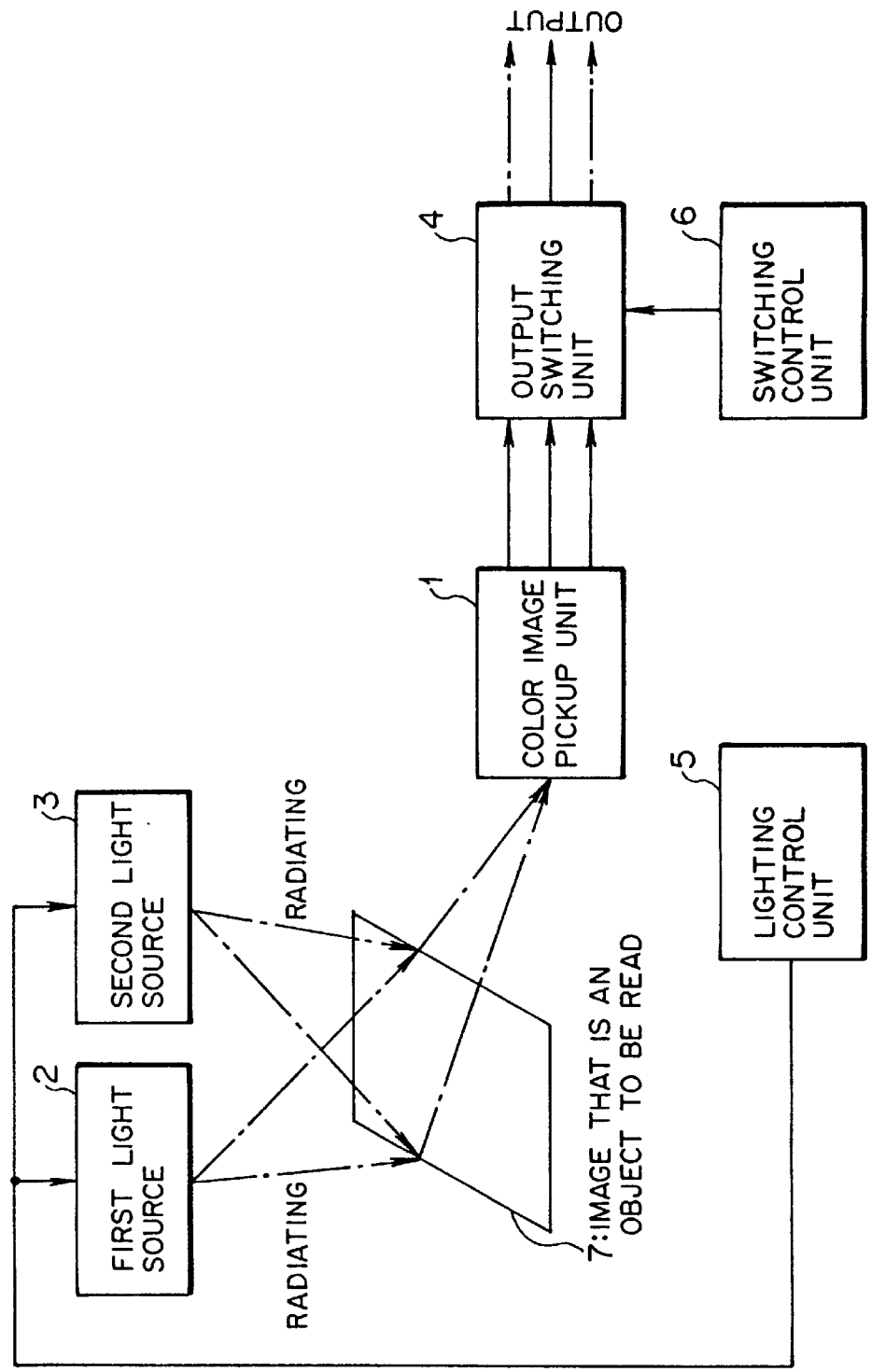
FIG. 1 is a block diagram showing an aspect of this invention.

DESCRIPTION OF THE PREFERRED EMBODIMENTS (a) Description of Aspect of the Invention Now, description will be made of an aspect of this invention referring to the drawings.

FIG. 1 is a block diagram showing the aspect of this invention. In FIG. 1, reference numeral 1 denotes a color image pickup unit, 2 and 3 denote a first light source and a second light source, respectively, 4 denotes an output switching unit, 5 denotes a lighting control unit, 6 denotes a switching control unit, and 7 denotes an image that is an object to be read.

The color image pickup unit 1 reads the image 7 at plural different reading wavelengths based on three primary colors of light and outputs it as plural kinds of read information. The first light source 2 generates a white light containing the above plural reading wavelengths to radiate it on the image 7. The second light source 3 generates a light if the image 7 is a monochromatic color image to radiate it on the image 7.

The output switching unit 4 selectively switches to either a first output state where plural kinds of read information from the color image pickup unit 1 are all output as a result of an image reading or a second output state where only one kind of read information among the plural kinds of read information from the color image pickup unit 1 is selected to be output as a result of an image reading. The lighting control unit 5 controls lighting conditions of the first light source 2 and the second light source 3. The switching control unit 6 controls a switching condition of the output switching unit 4.

In the image reading apparatus applied with an image reading method of this invention thereto, if the image 7 is a multicolor image, the lighting control unit 5 causes only the first light source 2 to be lit, besides the switching control unit 6 switches the output switching unit 4 to the above first output state. If the image that is an object to be read 7 is a monochromatic color image, the lighting control unit 5 causes the first light source 2 and the second light source 3 to be lit, besides the switching control unit 6 switches the output switching unit 4 to the above second output state.

Accordingly, if the image 7 is a multicolor image, the multicolor image is read out by the color image pickup unit 1 as usual under a condition where only a white light from the first light source 2 is radiated on the multicolor image, and all plural kinds of read information from the color image pickup unit 1 is output as a result of an image reading.

On the contrary, if the image 7 is a monochromatic color image, the monochromatic color image is read out by the color image pickup unit 1 under a condition where light from the first light source 2 and the second light source 3 are radiated on the monochromatic color image, and only one kind of read information among the plural kinds of read information output from the color image pickup unit 1 is output as a result of an image reading.

According to the image reading method and the image reading apparatus of this invention, if the image 7 is a multicolor image, only the first light source 2 is lit so that the multicolor image is read by the color pickup unit 1 as usual. If the image 7 is a monochromatic color image, a white light from the first light source 2 and a light in a specific color from the second light source 3 are radiated on the monochromatic color image, and only one kind of read information among plural kinds of read information from the color image pickup unit 1 is output as a result of a reading of the monochromatic color image. This invention therefore may largely improve a processing speed of a process at the time of a reading of a monochromatic color image as compared with a process at the time of a multicolor image reading.

In the above second output state, a wavelength of the light generated by the second light source 3 has the same wavelength as any one of plural reading wavelengths. If the image that is an object to be read 7 is a monochromatic color image, read information having been obtained at a wavelength of a light generated by the second light source 3 as a reading wavelength among plural kinds of read information output from the color image pickup unit 1 is output as a result of an image reading.

If a wavelength of the light generated by the second light source 3 is the same wavelength as any one of plural reading wavelengths when a monochromatic color image is read, read information having been obtained at a wavelength of the light generated by the second light source 3 as a reading wavelength among plural kinds of read information output-ted from the color image pickup unit 1 is output as a result of an image reading.

Namely, by radiating a light in a specific color from the second light source 3 along with the white light from the first light source 2 on the image 7, the color image pickup unit 1 may read out the monochromatic color image under a condition where a sufficient quantity of the light in the specific color is provided and output only one kind of read information of the specific color as a result of the image reading.

According to the image reading method and the image reading apparatus of this invention, it is possible to perform a process at the time of a monochromatic image reading at a higher speed and more efficiently.

In the image reading method and the image reading apparatus of this invention, a wavelength of the light generated by the above second light source 3 is set on the basis of a spectral sensitivity characteristic of the color image pickup unit 1 and emission characteristics of the first light source 2 and the second light source 3. In practice, a light source generating a green light is used as the second light source 3 so that the light generated by the second light source 3 is set to a green light.

It is therefore possible to improve an efficiency of the process to read a monochromatic color image. In particular, by setting the light generated by the second light source 3 to a green light, it is possible to improve an efficiency of the reading process.

According to the image reading method and the image reading apparatus of this invention, it is possible to perform the reading process at the time of a reading of a monochromatic color image very efficiently. In particular, by setting the light generated by the second light source 3 to a green light, it is possible to perform the reading process at the time of a reading of a monochromatic color image very efficiently.

According to the image reading method and the image reading apparatus of this invention, the color image pickup unit 1 has plural photodiodes for receiving reflected light from a multicolor image or a monochromatic color image to store electric charges depending on a quantity of the reflected light, and outputs the electric charges stored in the plural photodiodes as read information. The color image pickup unit 1 also has a storing time control unit for controlling a time required to store the electric charges in the plural photodiodes. The storing time control unit may set a time required to store the electric charge when a monochromatic color image is read where the first light source 2 and the second light source 3 are lit shorter than a time required to store the electric charges when a multicolor image is read where only the first light source 2 is lighted.

The storing time control unit sets a time required to store electric charges in the color image pickup unit 1 when a monochromatic color image is read so as to provide a sufficient quantity of light shorter than a time required to store the electric charges when a multicolor image is read. It is therefore possible to take out the electric charges as read information of a monochromatic color image quicker than the case of a multicolor image.

According to the image reading method and the image reading apparatus of this invention, it is possible to take out the electric charges as read information of an image at the time of a monochromatic image reading quicker than a multicolor image reading so that a process of a monochromatic image reading may be certainly performed at a higher speed.

(b) Description of an Embodiment of the Invention

Now, description will be made of an embodiment of this invention referring to the drawings.

Figure 2:
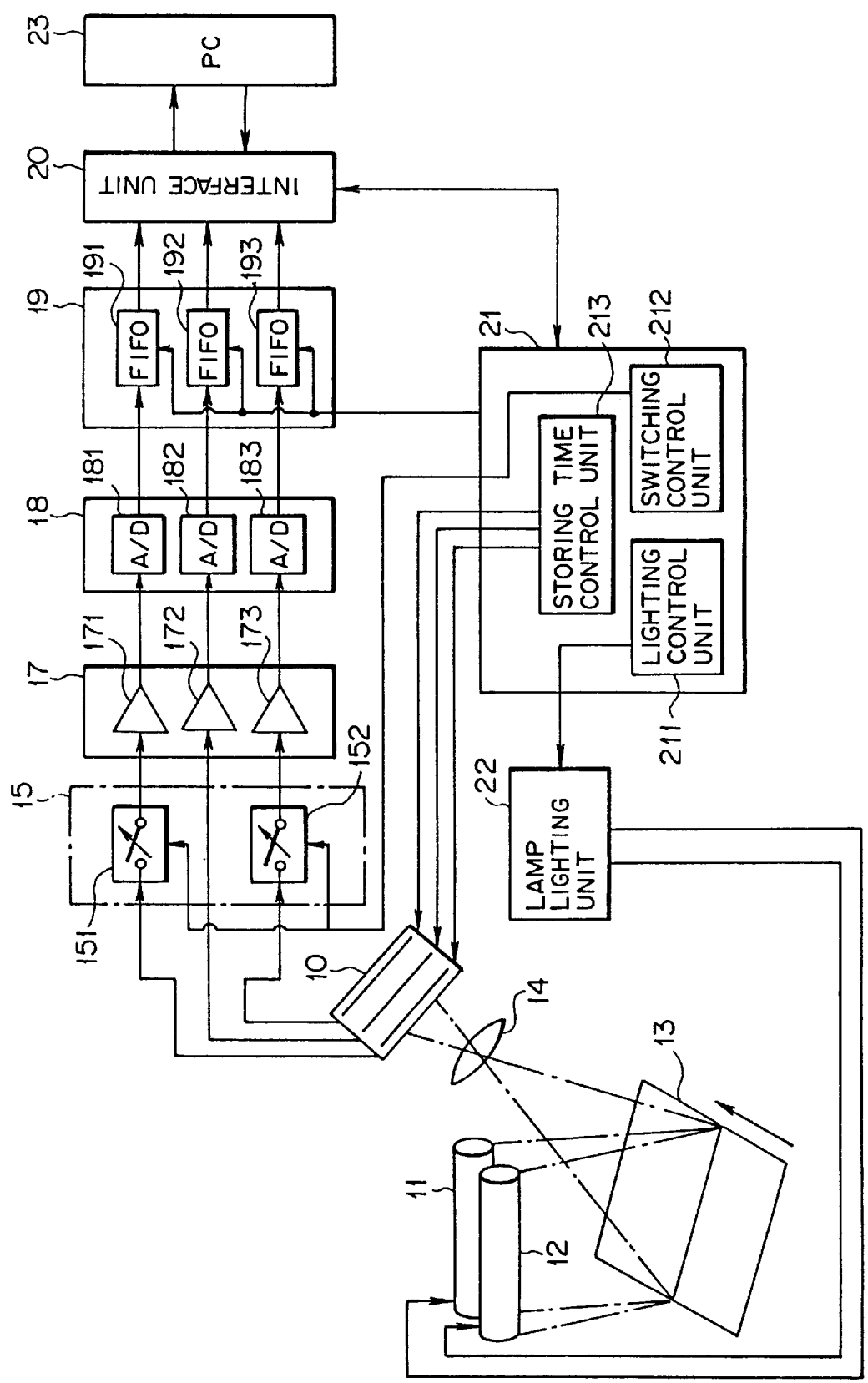
FIG. 2 is a block diagram of an image reading apparatus according to an embodiment of this invention.

FIG. 2 is a block diagram showing a structure of an image reading apparatus as an embodiment of this invention. In FIG. 2, reference numeral 10 denotes a color CCD, 11 denotes a white fluorescent lamp, 12 denotes a green fluorescent lamp, 13 denotes an original on which an image that is an object to be read is drawn, 14 denotes a lens which condenses a reflected light from the original and projects it as an incident light on the color CCD 10, 15 denotes an output switching unit, 17 denotes an amplifying unit, 18 denotes an A/D converting unit, 19 denotes a buffer storage, 20 denotes an interface unit, 21 denotes a control unit, 22 denotes a lump lighting unit, and 23 denotes a personal computer (PC).

The color CCD (a color image pickup unit) 10 reads the original (an image that is an object to be read) 13 at three (plural) reading wavelengths based on three primary colors of light of red (R), green (G) and blue (B) contained in a reflected light from the original 13, and outputs it as image data (read information, an RGB output) of the (plural) three colors. In this embodiment, a color CCD linear image sensor (TCD 140AC) manufactured by Toshiba Corp. is employed, for example. Description of a detailed structure of the color CCD 10 will be made later with reference to FIG. 3.

The white fluorescent lamp (a first light source) 11 generates a white light containing all the above three reading wavelengths of R, G and B, and radiates it on the original 13. The green fluorescent lamp (a second light source) 12 generates a light having the same wavelength as that of G (green) among the reading wavelengths of R, G and B, and radiates it on the original 13. These fluorescent lamps 11 and 12 are driven by the lamp lighting unit 22 to be on or off, respectively.

The output switching unit 15 is formed with two analog switches 151 and 152 interposed in an R output line and a B output line of the color CCD 10, respectively. These analog switches receive a control signal from the control unit 21 described later, whereby their conditions are simultaneously switched to ON or OFF to selectively switch to a condition where image data of all three colors of R, G and B from the color CCD 10 is output as a result of an image reading to the amplifying unit 17 described later (a first output state) or a condition where image data of only one color (G) having been obtained at a wavelength of a light generated by the green fluorescent lamp 12, that is, a green light, as a reading wavelength among image data of three colors of R, G and B is output as a result of an image reading to the amplifying unit 17 described later (a second output state).

The amplifying unit 17 amplifies results of the image reading of three colors of R, G and B from the color CCD 10 to desired signal levels, respectively. The A/D converting unit 18 converts the results of the image reading (analog signals) having been amplified by the amplifying unit 17 into digital signals, respectively. To this end, the amplifying unit 17 and the A/D converting unit 18 have amplifiers 171 through 173 and A/D converters 181 through 183, respectively, correspondingly to the image data of three colors of R, G and B.

The buffer storage 19 temporarily stores the image data of three colors of R, G and B having been converted into the digital signals by the A/D converting unit 18, respectively, and successively outputs it to the interface unit 20 according to a control signal from the control unit 21. The buffer storage 19 has three storages of an FIFO type (First In First Out memory) 191 through 193 correspondingly to the image data of three colors.

When the analog switches 151 and 152 are both OFF (the second output state), the amplifying unit 17, the A/D converting unit 18 and the buffer storage 19 perform respective processes only on image data of one color (G). Namely, only the amplifier 172, the A/D converter 182 and the FIFO memory 192 operate.

The interface unit 20 outputs the signals temporarily stored in the buffer storage 19 to the personal computer 23. Via the interface unit 20, an instruction of a multicolor reading in the case where the original 13 that is an object to be read is a multicolor image or an instruction of a monochromatic color reading in the case where the original 13 is a monochromatic color image (a single color image) is supplied from the personal computer 23 to the control unit 21 described later. Incidentally, SCSi (Small Computer System interface) is widely used as a standard interface in an image reading apparatus such as an image scanner, in general. In practice, the SCSi is possibly used as the interface unit 20.

The control unit 21 controls the color CCD 10, the output switching unit 15, the buffer storage 19 and the lamp lighting unit 22 according to an instruction (a multicolor reading or a monochromatic color reading) from the personal computer 23. The control unit 21 has a lighting control unit 211 for controlling the lamp lighting unit 22 (that is, lighting conditions of the fluorescent lamps 11 and 12), a switching control unit 212 for controlling a switching condition of the output switching unit 15 (that is, ON/OFF states of the analog switches 151 and 152), and a storing time control unit 213 for controlling the color CCD 10. The structure of the storing time control unit 211 will be described in detail later with reference to FIG. 4.

Figure 3:
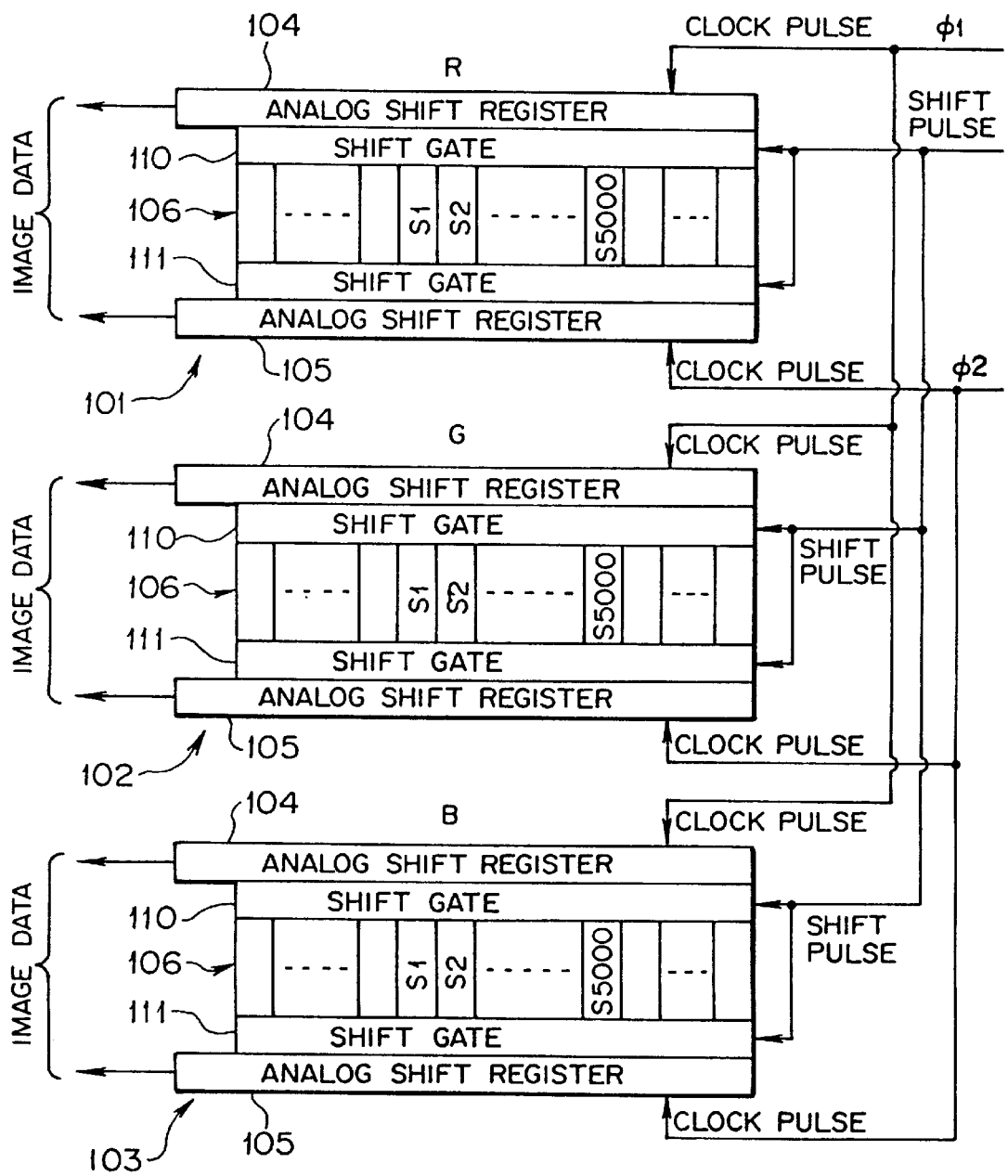
FIG. 3 is a block diagram of a color CCD in the image reading apparatus according to the embodiment.

Next, the color CCD will be described in more detail with reference to FIG. 3. As shown in FIG. 3, the color CCD 10 has light receiving circuits 101 through 103 for receiving a light in red (R), a light in green (G) and a light in blue (B), respectively, and output image data of three colors of R, G and B. Each of the light receiving circuits 101 through 103 has analog shift registers 104 and 105, a light receiving unit 106 and a shift gates 110 and 111.

The light receiving unit 106 has, for example, five thousands photodiodes (picture element) S1 through S5000. These photodiodes S1 through S5000 receive a reflected light from the above-mentioned multicolor or monochromatic color original 13 to store electric charges depending on a quantity of the reflected light. On both sides of the photodiodes S1 through S5000, dummy portions made up of plural photodiodes which do not actually operate are formed.

When receiving a shift pulse from the control unit 21 (the storing time control unit 213 described later), the shift gates 110 and 111 transfer electric charges stored in the photodiodes S1, S3, S5, . . . , S4999 and S2, S4, S6, . . . , S5000 to the analog shift registers 104 and 105, respectively.

The analog shift registers 104 and 105 successively transfer the 2500 electric charges from the photodiodes S1 through S5000 according to clock pulses φ1 and φ2 from the control unit 21 (the storing time control unit 213 described later) to output them, respectively.

The color CCD 10 with the above structure receives reflected light from the multicolor or monochromatic color original 13, stores electric charges depending on a quantity of the reflected light in the photodiodes S1 through S5000 of the light receiving circuits 101 through 103, and outputs the electric charges stored in the plural photodiodes S1 through S5000 as image data (read information) of three colors of R, G and B.

In practice, in the light receiving circuit 101, for example, electric charges depending on a quantity of a red light (R) in the reflected light from the original 13 are stored in the photodiodes S1 through S5000 of the light receiving unit 106. By giving a shift pulse to each of the shift gates 110 and 111 from the control unit 21 (the storing time control unit 213 described later), the 5000 electric charges stored in the photodiodes S1 through S5000 are transferred at a time to the analog registers 104 and 105. Further, by giving the clock pulses φ1 and φ2 to the analog registers 104 and 105, respectively, from the control unit 21, the 5000 electric charges stored are successively transferred to be output as image data of red color (R) from the analog registers 104 and 105. Each of the light receiving circuits 102 and 103 has a structure similar to that of the light receiving circuit 101 described above, which outputs image data of green color (G) and blue color (B), respectively.

A quantity of light received by the color CCD 10 and an outputting rate of the color CCD 10 as described above are controlled by time intervals of the shift pulses and the clock pulses supplied from the control unit 21 to the color CCD 10.

Figure 4:
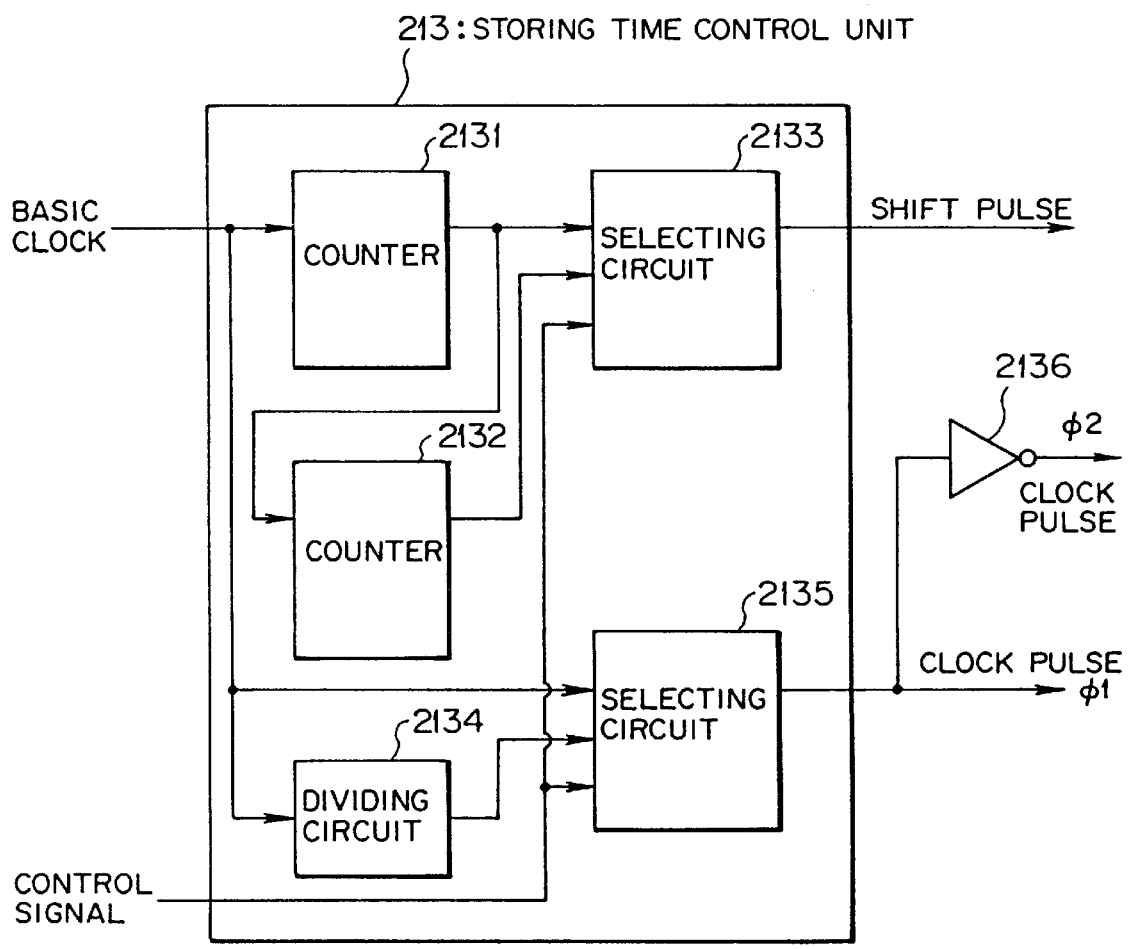
FIG. 4 is a block diagram of a storing time control unit in the image reading apparatus according to the embodiment.

The storing time control unit 213 of the control unit 21 described before with reference to FIG. 2 generates these shift pulses and clock pulses, and supplies them to the color CCD 10. The storing time control unit 213 controls a time required to store electric charges in the photodiodes S1 through S5000 in the color CCD 10. The storing time control unit 213 has, as shown in FIG. 4, counters 2131 and 2132, selecting circuits 2133 and 2135 and a frequency dividing circuit 2134.

Figure 5:
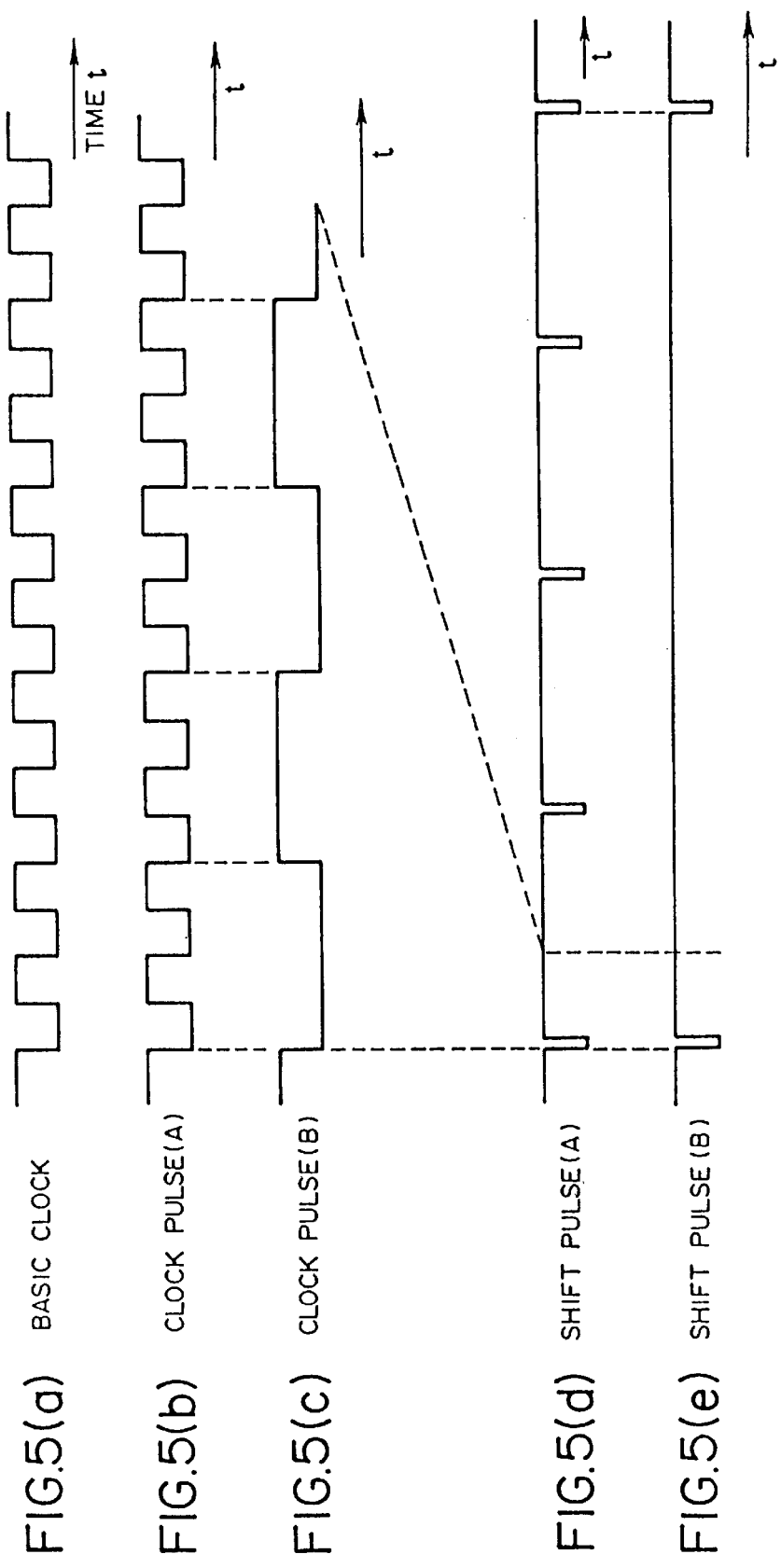
FIGS. 5(a) through 5(e) are timing charts for illustrating an operation of the storing time control unit in the image reading apparatus according to the embodiment.

The counter 2131 counts basic clocks refer to FIG. 5(a), and outputs a Low level signal refer to FIG. 5(d), each time the counter 2131 counts up a predetermined number a (half of the number of picture elements of the light receiving unit 106 (including the number of picture elements in the dummy portion). The counter 2132 counts the Low level signals from the counter 2131, and outputs a Low level signal (refer to FIG. 5(e)) each time the counter 2132 counts up a predetermined number (for example, 4).

The selecting circuit 2133 selects a signal from the counter 2132 in a multicolor image reading, or selects a signal from the counter 2131 in a monochromatic color image reading, and outputs it as a shift pulse (refer to FIGS. 5(d) and 5(e)).

The frequency dividing circuit 2134 provides a signal whose frequency is, for example, one-fourth the frequency of the basic clock (refer to FIG. 5(c)), and outputs it. The selecting circuit 2135 selects a signal from the frequency dividing circuit 2134 in a multicolor image reading, or selects the basis clock in a monochromatic color image reading, and outputs it as a clock pulse (refer to FIGS. 5(b) and 5(c)).

In this embodiment, the clock pulse from the selecting circuit 2135 is supplied as a pulse φ1 to each of the analog shift registers 104 of the color CCD 10, and is inverted by an inverter 2136 to be supplied as a pulse φ2 to each of the analog shift registers 105 of the color CCD 10, whereby image data (electric charges) is alternately output from the analog shift register 104 and the analog shift register 105.

Hereinafter, operations of the storing time control unit 213 upon a monochromatic color reading and a multicolor reading will be described in detail.

To the storing time control unit 213, a clock at a time interval as shown in FIG. 5(a) is input as the basic clock. Upon a monochromatic color reading, the same clock as the basic clock is selected by the selecting circuit 2135, and a clock pulse (A) (refer to FIG. 5(b)) is outputt as the pulses φ1 and φ2 to the color CCD 10.

At that time, the basic clock pulses shown in FIG. 5(a) are counted by the counter 2131. The counter 2131 outputs a signal which becomes a Low level each time the counter 2131 counts up a predetermined number as a shift pulse (A) as shown in FIG. 5(d). The shift pulse (A) is output to the color CCD 10 via the selecting circuit 2133.

As a result, in the color CCD 10, the shift pulse (A) is supplied to each of the shift gates 110 and 111 to transfer the electric charges stored in the photodiodes S1 through S5000 to the respective analog shift registers 104 and 105, as having been described with reference to FIG. 3. After that, the clock pulse (A), φ1 and φ2, are supplied to the respective analog shift registers 104 and 105 to output the image data of three colors of R, G and B.

Upon a multicolor reading, a quantity of light received by the color CCD 10 decreases since only the white fluorescent lamp 11 is lit, as compared with a monochromatic color reading in which the white fluorescent lamp 11 and the green fluorescent lamp 12 are both lit. It is therefore necessary to increase a time required to store electric charges in the photodiodes S1 through S5000 in each of the light receiving circuits 101 through 103. In this case, it is experimentally known that a quantity of light received by the color CCD 10 is approximately one-fourth a quantity of light where the white fluorescent lamp 11 and the green fluorescent lamp 12 are both lit. In consequence, it is necessary to take a time interval four times the time interval of the shift pulses (A) (refer to FIG. 5(d)) generated upon a monochromatic color reading.

According to this embodiment, the counter 2132 counts the shift pulses (A) obtained by the counter 2131, and generates the shift pulse (B) each time the counter 2132 counts up four shift pulses (A) so as to provide the shift pulse (B) having a time interval four times that of the shift pulse (A) (refer to FIG. 5(d)). The shift pulse (B) is output to the color CCD 10 via the selecting circuit 2133.

At that time, the frequency dividing circuit 2134 divides a frequency of the basic clock (refer to FIG. 5(a)) to generate a clock pulse (B) having a time interval four times that of the basic clock (refer to FIG. 5(c)), and outputs it to the color CCD 10 via the selecting circuit 2135. Incidentally, selection of the clock pulse and the shift pulse in the selecting circuit 2133 and the selecting circuit 2135 is performed according to an instruction (a multicolor reading or a monochromatic color reading) from the personal computer 23.

In this case, a time interval of the shift pulses (A) used in a monochromatic color reading is one-fourth a time interval of the shift pulses (B) used in a multicolor reading. In consequence, a time required to store electric charges in the plural photodiodes S1 through S5000 in a monochromatic color reading where the white fluorescent lamp 11 and the green fluorescent lamp 12 are both lit is set by the storing time control unit 213 to a shorter time about one-fourth the time required to store electric charges in the plural photodiodes S1 through S5000 in the multicolor reading where only the white fluorescent lamp is lit. As a result, the reading process upon a monochromatic color reading may be performed at a speed four times a speed of that upon a multicolor reading, in other words, the reading process upon a monochromatic color reading requires a time one-fourth that upon a multicolor reading. In the case where two white fluorescent lamps are used instead of the white fluorescent lamp 11 and the green fluorescent lamp 12, it is known that the processing speed of the monochromatic color reading process can be improved only about two times the processing speed of the multicolor reading process.

Figure 7:
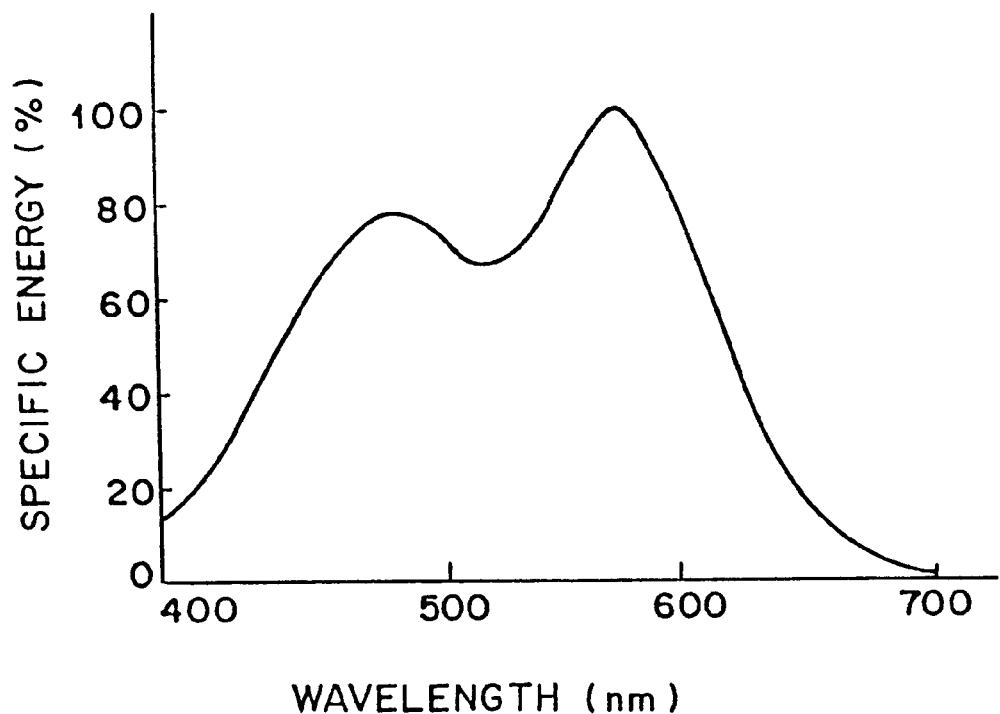
FIG. 7 is a graph showing an emission characteristic of a white fluorescent lamp according to the embodiment.
Figure 8:
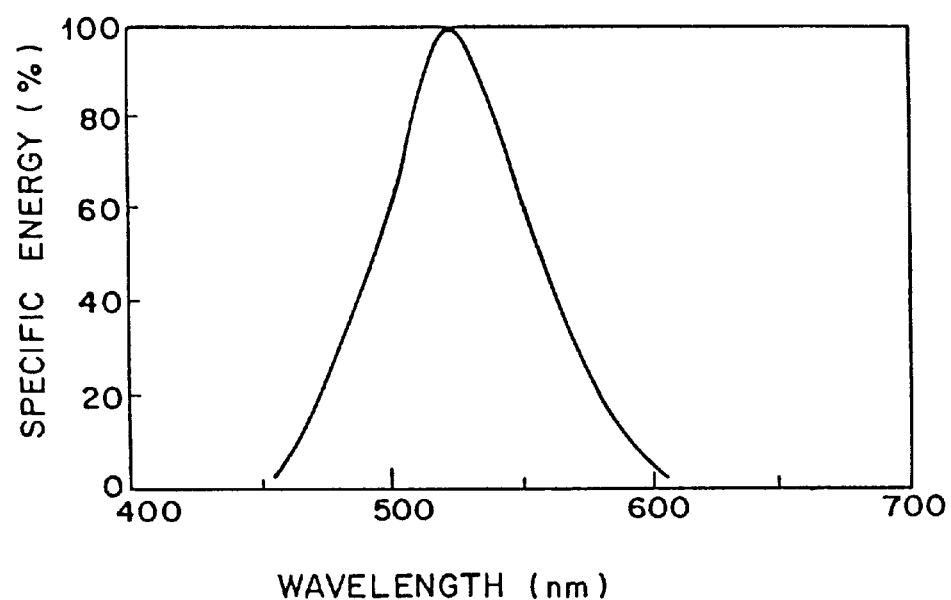
FIG. 8 is a graph showing an emission characteristic of a green fluorescent lamp according to the embodiment.

In this embodiment, the green fluorescent lamp 12 is used in addition to the white fluorescent lamp 11. Why the green fluorescent lamp 12 generating a green light is used is that an emission output of a fluorescent lamp generating a green light is the largest when the same current flows in the fluorescent lamps. FIGS. 7 and 8 show emission characteristics of the white fluorescent lamp 11 and the green fluorescent lamp 12, respectively. As seen from FIGS. 7 and 8, the largest emission output is available in a wavelength in the vicinity of about 500 to 600 nm when the white fluorescent lamp 11 and the green fluorescent lamp 12 are both lit, which is more than three times when the two white fluorescent lamps 11 are simultaneously lit, for example.

Figure 9:
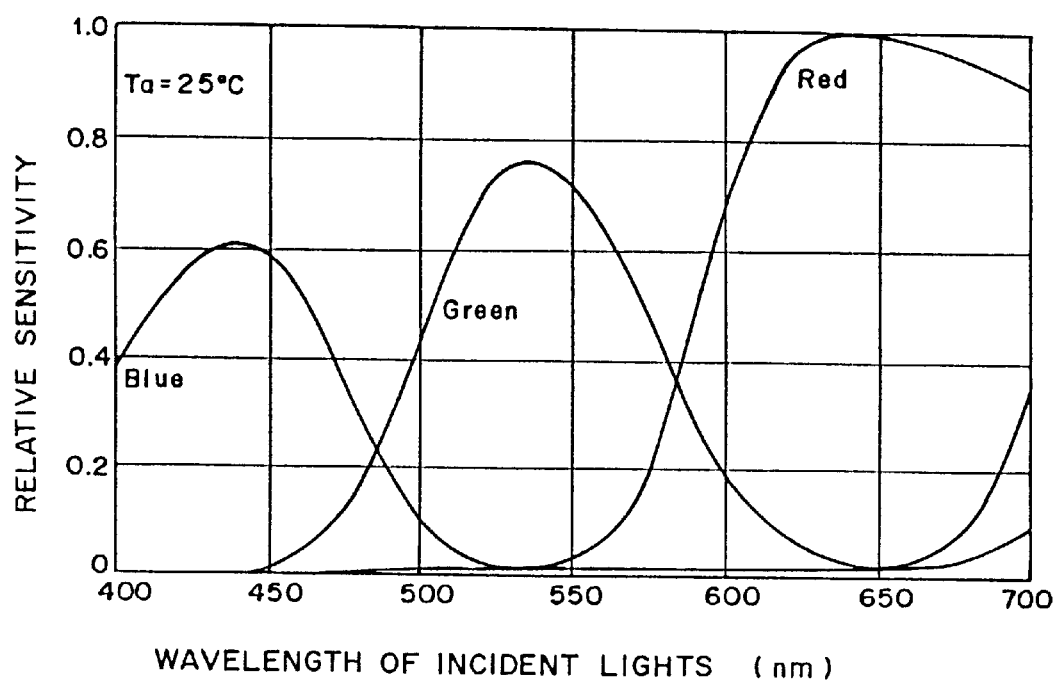
FIG. 9 is a graph showing a spectral sensitivity characteristic of the color CCD according to the embodiment.
Figure 10:
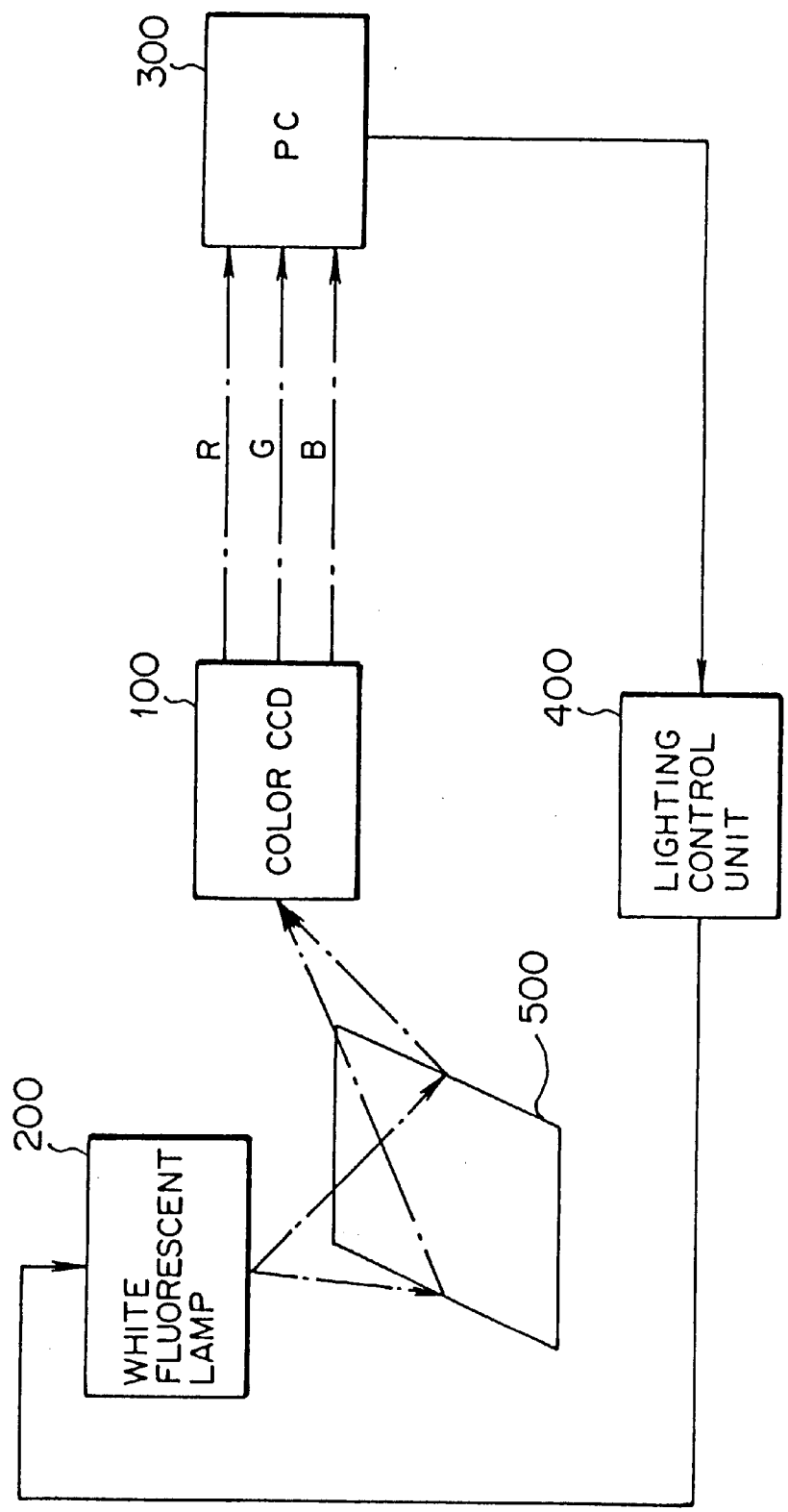
FIG. 10 is a block diagram of a general image reading apparatus.
Figure 11:
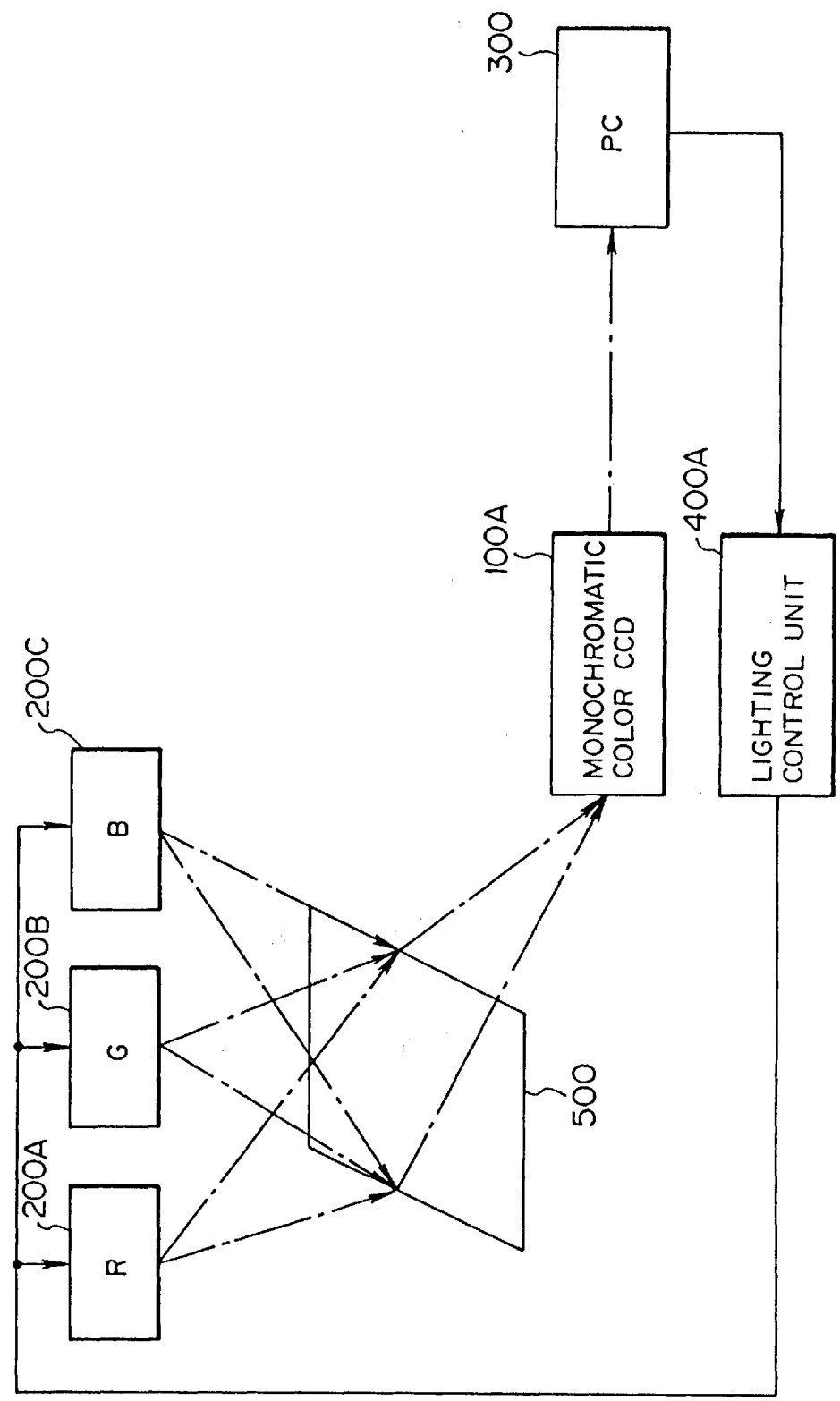
FIG. 11 is a block diagram of another general image reading apparatus.

The color CCD 10 has, in general, a spectral sensitivity characteristics of R, G and B as shown in FIG. 9. As seen from FIG. 9, the highest spectral sensitivity of the green light is obtained in a wavelength in the vicinity of about 500 to 550 nm. Namely, the emission characteristic obtained when the white fluorescent lamp 11 and the green fluorescent lamp 12 are both lit becomes the largest in a wavelength in the vicinity of 500 to 550 nm where the highest spectral sensitivity to the green light of the color CCD 10 is obtained.

In the monochromatic color reading where the while fluorescent lamp 11 and the green fluorescent lamp 12 are both lit, the most efficient reading process becomes possible by using the green fluorescent lamp 12 generating a light in green (G) among three colors of R, G and B in addition to the white fluorescent lamp 11 containing all wavelengths of three colors of R, G and B. In other words, a wavelength of a light generated by the green fluorescent lamp (the second light source 12) is set on the basis of the spectral sensitivity characteristic of the color CCD 10 and the emission characteristics of the fluorescent lamps, thereby performing the most efficient process in a monochromatic color reading.

If the red fluorescent lamp generating a light in, for example, red (R) among three colors of R, G and B is used instead of the green fluorescent lamp 12, only a half of the quantity of light is obtained at the same electric power as compared with a use of the green fluorescent lamp 12.

In the monochromatic color reading, if only the white fluorescent lamp 11 is lit, a quantity of a light received by the color CCD 10 decreases so that it is difficult to obtain accurate image data. For this, the white fluorescent lamp 11 and the green fluorescent lamp 12 are both lit to prevent a degradation of the quality of the image.

Figure 6:
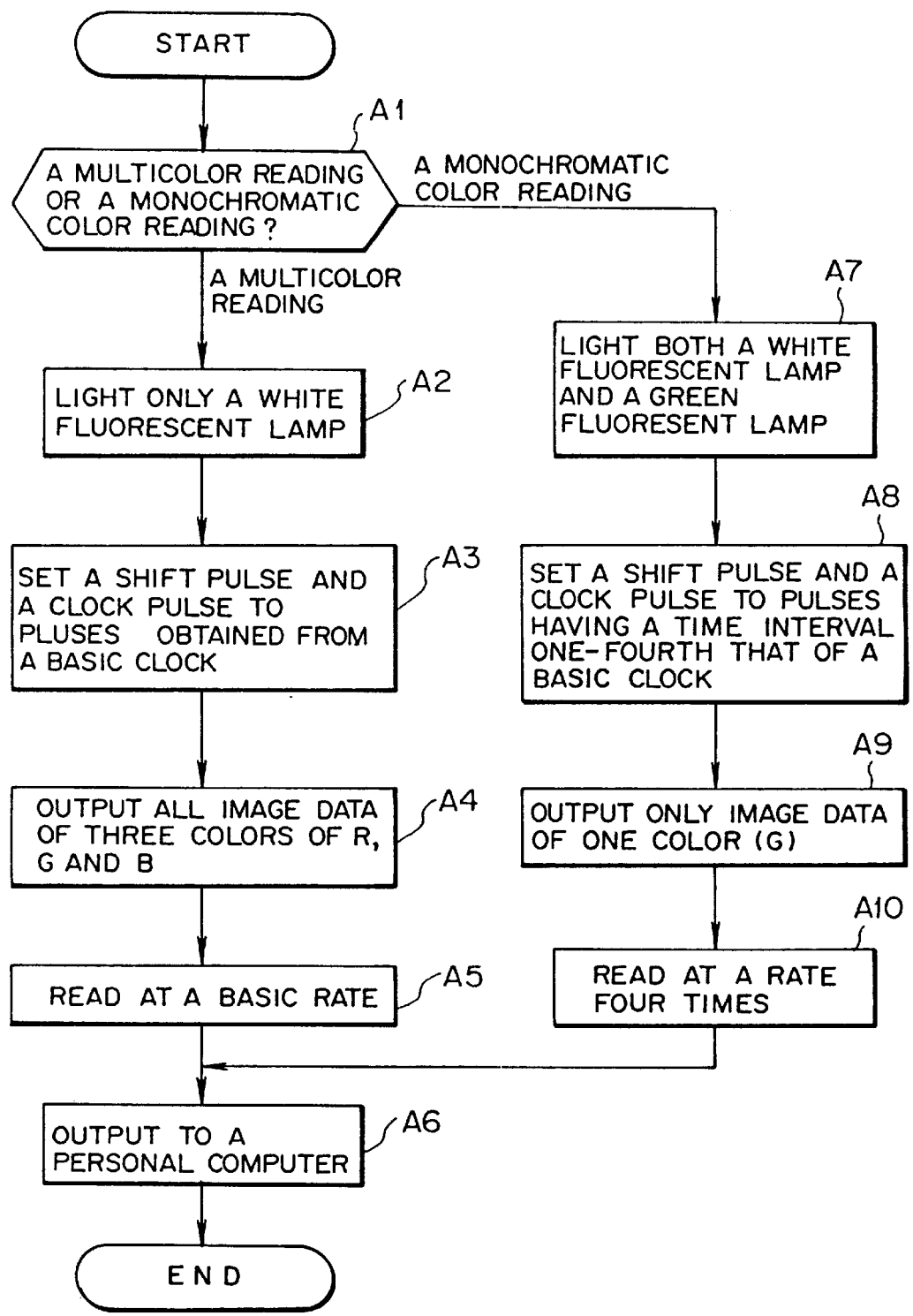
FIG. 6 is a flowchart for illustrating an operation of the entire image reading apparatus according to the embodiment.

Next, an operation of the image reading apparatus (the control unit 21) of this embodiment with the above structure will be described with reference to a flowchart (from Step A1 to Step A10) shown in FIG. 6. Whether the image reading apparatus reads a multicolor image or a monochromatic color image is previously instructed by the personal computer 23 via the interface unit 20, and set as a flag in the control unit 21.

First, the control unit 21 determines which a reading of a multicolor image or a reading of a monochromatic color image is instructed (Step A1). If the multicolor image is to be read, the lighting control unit 211 of the control unit 21 controls the lamp lighting unit 22 to cause only the white fluorescent lamp 11 to be lit (Step A2). The storing time control unit 213 of the control unit 21 sets the shift pulse and the clock pulse that are to be output to the color CCD 10 to the respective pulses obtained from the basic pulse (Step A3). The switching control unit 212 of the control unit 21 causes both the analog switches 151 and 152 to be ON (the first output state) to output all image data of three colors of R, G and B as results of the image reading to the amplifying unit 17 (Step A4).

A light of the white fluorescent lamp 11 is radiated on the original (a multicolor image) 13, and a reflected light thereof is converged by the lens 14 to be radiated onto the color CCD 10. The color CCD 10 receives the reflected light, thereby reading the original 13 at wavelengths of three colors of R, G and B (reading wavelengths) at a basic rate (Step A5).

In that occasion, the analog switches 151 and 152 are both ON so that the image data of three colors of R, G and B from the color CCD 10 is amplified by the amplifiers 171 through 173 of the amplifying unit 17, converted into digital information by the A/D converter 181 through 183 of the A/D converting unit 18, respectively, and sent out to the buffer storage 19.

The image data of the three colors (R, G and B) sent to the buffer storage 19 is temporarily stored in the storages 191 through 193 of an FIFO type provided in the respective lines, and sent out to the personal computer 23 via the interface unit 20 according to an instruction from the control unit 21 (Step A6).

The storages of an FIFO type 191 through 193 each temporarily stores one line data of R, G or B and sends it to the interface unit 20. For this, each of the storages 191 through 193 has a storage capacity of, at least, 2 KB×2 if the one line data of each color is 2 KB (2 kilo bytes). Each of the storages 191 through 193 is alternately read and written every one line data of each color therefrom and therein, whereby the image data of three colors of R, G and B are sent out from the interface unit 20 toward the personal computer 23.

As above, in the case of a multicolor reading, only the white fluorescent lamp 11 is lit. The original (a multicolor image) 13 is read by the color CCD under a condition where a light from the white fluorescent lamp 11 is radiated on the original 13, and image data of all three colors of R, G and B is output as results of the image reading from the color CCD 10.

On the other hand, when it is determined at Step A1 that a monochromatic color image (a single color image) is to be read, the lighting control unit 211 of the control unit 21 controls the lamp lighting unit 22 to cause both the white fluorescent lamp 11 and the green fluorescent lamp 12 to be lit (Step A7). The storing time control unit 213 of the control unit 21 sets the shift pulse and the clock pulse to be output to the color CCD 10 to pulses having a time interval one-fourth that of the basic clock (Step A8). At the same time, the switching control unit 212 of the control unit 21 causes both the analog switches 151 and 152 to be OFF (the second output state) to output the image data of only one color (G) out of the image data of three colors of R, G and B as a result of the image reading to the amplifying unit 17 (Step A9).

Light from both the white fluorescent lamp 11 and the green fluorescent lamp 12 are radiated on the original (a multicolor image) 13, and a reflected light therefrom is converged by the lens 14 to be radiated on the color CCD 10, in the same manner as the above case. The color CCD 10 receives the reflected light, thereby reading the original 13 at wavelengths (reading wavelengths) of light of three colors of R, G and B at a rate four times the basic rate (Step A10), and outputting image data of the three colors of R, G and B to the amplifying unit 17.

At that time, the analog switches 151 and 152 both are OFF in contrast with a multicolor reading, so image data of only G (Green) out of the image data of three colors of R, G and B from the color CCD 10 is amplified by the amplifier 172 of the amplifying unit 17, converted into digital information by the A/D converter 182 of the A/D converting unit 18, temporarily stored in the buffer storage 19, and sent to the personal computer 23 via the interface unit 20 (Step A6).

In short, in a monochromatic color reading, the white fluorescent lamp 11 and the green fluorescent lamp 12 are lit, the color CCD reads the original 13 under a condition where light from the white fluorescent lamp 11 and the green fluorescent lamp 12 is radiated on the original 13, image data of only one color (G) having been obtained at a wavelength of a light generated by the green fluorescent lamp 12 as a reading wavelength among image data of three colors of R, G and B output from the color CCD 10 is output as a result of the image reading.

If a time required to send image data of three colors of R, G and B by one line is 1 ms per color, for example, 3 ms is required per line in a multicolor reading since the image data of all three colors have to be transmitted. In a monochromatic color reading, a time of only 1 ms is required per line since the image data of only one color (G) is transmitted. According to this embodiment, it is possible to largely speed up a process of the monochromatic color reading as compared with a process of the multicolor reading.

According to this embodiment, the fluorescent lamps 11 and 12 both are lit in the monochromatic color reading to provide a sufficient quantity of light. It is therefore possible to certainly read an image even if a time required to store electric charges in the color CCD 10 is shortened by the storing time control unit 213, and improve a processing speed of a reading process to read a monochromatic color image.

In the above embodiment, green (G) is selected as a color of a light generated as the second light source. It is alternatively possible to select red (R) or blue (B) depending on the spectral characteristic of the color CCD or the emission characteristics of the light sources. In which case, the same advantage and effect may be achieved.

What is claimed is:

1. An image reading method, for a color image reading system in which a multicolor original image and a monochromatic original image may be selectively read, comprising the steps of:

providing a shared color image pickup unit for reading said multicolor original image at plural different wavelengths based on blue, green and red primary colors of light and outputting plural kinds of image information as the result of the multicolor image reading, said shared color image pickup unit being adapted for reading said monochromatic original image at the wavelength of one of said blue, green and red primary colors of light and outputting one kind of said image information respectively corresponding to the result of the monochromatic image reading;

providing a white light source for radiating onto said multicolor original image a white light containing said plural wavelengths of said blue, green and red primary colors of light;

providing a monochromatic light source for radiating onto said monochromatic original image a monochromatic light containing the wavelength of said one of said blue, green and red primary colors of light;

selectively lighting only said white light source to radiate only said white light on said multicolor original image, or lighting both said white and monochromatic light sources to radiate both said white and monochromatic lights on said monochromatic original image;

selectively obtaining said image information corresponding to the multicolor image reading or obtaining said image information corresponding to the monochromatic image reading;

providing plural photodiodes for receiving a reflected light from said multicolor image or said monochromatic image and storing electric charges depending on a quantity of the reflected light to said shared color image pickup unit, and outputting the electric charges stored in said plural photodiodes as the image information; and setting a time required to store the electric charges in said plural photodiodes during the monochromatic image reading, where both said white light source and said monochromatic light source are lit, shorter than a time required to store the electric charges in said plural photodiodes during the multicolor image reading where only said white light source is lit.

2. An image reading method according to claim 1, wherein the wavelength of said monochromatic light to be radiated by said monochromatic light source is a same as that of said one primary color of said white light.

3. An image reading method according to claim 1, wherein the wavelength of said monochromatic light to be radiated by said monochromatic light source is set on the basis of a spectral sensitivity characteristic of said shared color image pickup unit and emission characteristics of said white and monochromatic light sources.

4. An image reading method according to claim 1, wherein said monochromatic light to be radiated by said monochromatic light source is a green light.

5. An image reading apparatus for selectively reading a multicolor original image or a monochromatic original image, comprising:

a shared color image pickup unit for reading said multicolor original image at plural different wavelengths based on blue, green and red primary colors of light and for outputting plural kinds of image information as the result of the multicolor image reading, said shared color image pickup unit being adapted for reading said monochromatic original image at the wavelength of one of said blue, green and red primary colors of light and for outputting one kind of said image information respectively corresponding to the result of the monochromatic image reading;

a white light source for radiating onto said multicolor original image a white light containing said plural wavelengths of all of said blue, green and red primary colors of light;

a monochromatic light source for radiating onto said monochromatic original image a monochromatic light containing the wavelength of said one primary color of light;

a multicolor/monochrome output-mode switching unit adapted to selectively assume a multicolor output mode in which said switching unit allows all of said different kinds of image information according to the multicolor image reading from said shared color image pickup unit to be output as multicolor image information for subsequent image processing, and a monochromatic output mode in which said switching unit allows only said one kind of image information according to the monochromatic image reading from said shared color image pickup unit to be output as monochromatic image information for subsequent image processing;

a lighting control unit for rendering only said white light source to be turned on with only said monochromatic light source to be turned off during the multicolor image reading or rendering both said white and monochromatic lights turned on during the monochromatic image reading; and an output-mode-switching control unit for rendering said output-mode switching unit to assume said multicolor output mode during the multicolor image reading or to assume said monochromatic output mode during the monochromatic image reading;

said shared color image pickup unit having plural photodiodes for receiving a reflected light from said multicolor original image or said monochromatic original image, storing electric charges depending on a quantity of the reflected light, and outputting the electric charges stored in said plural photodiodes as the image information;

said color image pickup unit further having a storing time control unit for controlling a time required to store the electric charges in said plural photodiodes;

said storing time control unit being adapted to set a time required to store the electric charges during the monochromatic image reading, where said white light source and said monochromatic light source are lit, shorter than a time required to store the electric charges during the multicolor image reading where only said white light source is lit.

6. An image reading apparatus according to claim 5, wherein the wavelength of said monochromatic light to be radiated by said monochromatic light source is the same as that of said one primary color of said white light.

7. An image reading apparatus according to claim 5, wherein the wavelength of said monochromatic light to be radiated by said monochromatic light source is set on the basis of a spectral sensitivity characteristic of said shared color image pickup unit and emission characteristics of said white and monochromatic light sources.

8. An image reading apparatus according to claim 5, wherein said monochromatic light to be radiated by said monochromatic light source is a green light.

9. An image reading method, for a color image reading system in which multicolor image reading and monochromatic image reading may be selectively carried out, comprising the steps of:

radiating on an original image, if said original image is of monochrome, both a white light containing different wavelengths of all of said blue, green and red colors of light from a white light source and a monochromatic light containing the wavelength of one of said blue, green and red colors from a monochromatic light source, or radiating on said original image, if said original is of multicolor, only said white light from the white light source;

reading said original image at the wavelengths of said blue, green and red colors of light using a shared color image pickup unit, if said original image is of multicolor, and then rendering the shared color image pickup unit to output different kinds of image information respectively corresponding to the result of the multicolor image reading, or reading said original image, if said original image is monochromatic, at the wavelength of said one color of light using the shared color image pickup unit, if said original image is monochromatic, and then rendering the shared color image pickup unit to output one kind of image information corresponding to the result of the monochromatic image reading; and selecting one between the multicolor image reading and the monochromatic image reading in accordance with whether said original image is of multicolor or monochrome using a lighting control unit and a multicolor/monochrome output-mode switching unit; and said selecting of image reading including rendering only the monochromatic light source to be turned off with the white light source to be turned on during the multicolor image reading or rendering both the white and monochromatic light sources to be turned on during the monochromatic image reading;

said selecting of image reading further including rendering the multicolor/monochrome output-mode switching unit to assume a multicolor output mode such that all of said different kinds of image information according to the multicolor image reading are allowed to be output from the shared color image pickup unit as multicolor image information for subsequent image processing or to assume a monochromatic output mode such that only said one kind of image information according to the monochromatic image reading is allowed to be output from the shared color image pickup unit as monochromatic image information for subsequent image processing.

10. An image reading method according to claim 9, wherein the wavelength of said monochromatic light to be radiated by said monochromatic light source is the same as that of said one primary color of said white light.

11. An image reading method according to claim 9, wherein the wavelength of said monochromatic light to be radiated by said monochromatic light source is set on the basis of a spectral sensitivity characteristic of said shared color image pickup and emission characteristics of said white and monochromatic light sources.

12. An image reading method according to claim 9, wherein said monochromatic light to be radiated by said monochromatic light source is a green light.

13. An image reading method according to claim 9, wherein said shared color image pickup unit has plural photodiodes for receiving a reflected light from said multicolor original image or said monochromatic color image and storing electric charges commensurate with a quality of the reflected light, and outputs said electric charges stored in said plural photodiodes as said image information, said shared color image pickup unit further having a storing time control unit for controlling a time required to store the electric charges in said plural photodiodes, setting said time required to store said electric charges at the time of reading of said monochromatic original image where both said white and monochromatic light sources are turned on for a time shorter than that of reading of said multicolor original image where only said white light source is turned on.

14. An image reading apparatus comprising:

a shared color image pickup unit for reading a multicolor original image at different wavelengths of blue, green and red colors of light and outputting different kinds of image information respectively corresponding to the result of multicolor image reading, said shared color image pickup unit being adapted for reading a monochromatic original image at the wavelength of one of said blue, green and red colors of light and outputting one kind of said image information corresponding to the result of monochromatic image reading;

a white light source for radiating a white light containing the wavelengths of all of said blue, green and red colors of light on said multicolor original image;

a monochromatic light source for radiating a monochromatic light containing the wavelength of said one color of light;

a multicolor/monochrome output-mode switching unit adapted to selectively assume a multicolor output mode in which said switching unit allows all of said different kinds of image information according to the multicolor image reading from said shared color image pickup unit to be output as multicolor image information for subsequent image processing, and a monochromatic output mode in which said switching unit allows only said one kind of image information according to the monochromatic image reading from said shared color image pickup unit to be output as monochromatic image information for subsequent image processing;

a lighting control unit for rendering only said monochromatic light source to be turned off with only said white light source to be turned on during the multicolor image reading or for rendering both said white and monochromatic light sources to be turned on during the monochromatic image reading; and an output-mode-switching control unit for rendering said output-mode switching unit to assume said multicolor output mode during the multicolor image reading or to assume said monochromatic output mode during the monochromatic image reading.

15. An image-reading apparatus according to claim 14, wherein the wavelength of said monochromatic light to be radiated by said monochromatic light source is the same as that of said one primary color of said white light.

16. An image reading apparatus according to claim 14, wherein the wavelength of said monochromatic light to be radiated by said monochromatic light source is set on the basis of a spectral sensitivity characteristic of said shared color image pickup and emission characteristics of said white and monochromatic light sources.

17. An image reading apparatus according to claim 14, wherein said monochromatic light to be radiated by said monochromatic light source is a green light.

18. An image reading apparatus according to claim 14, wherein said shared color image pickup unit has plural photodiodes for receiving a reflected light from said multicolor original image or said monochromatic color image and storing electric charges commensurate with a quality of the reflected light, and outputs said electric charges stored in said plural photodiodes as said image information, said shared color image pickup unit further having a storing time control unit for controlling a time required to store said electric charges in said plural photodiodes and setting said time required to store said electric charges at the time of reading of said monochromatic original image where both said white and monochromatic light sources are turned on for a time shorter than that of reading of said multicolor original image where only said white light source is turned on.

* * * * *